United States Patent
Memory et al.

[11] Patent Number: 5,988,357
[45] Date of Patent: Nov. 23, 1999

[54] LOW SPLASH AUGER INLET

[75] Inventors: Russell J. Memory; Blake R. Neudorf, both of Saskatoon, Canada

[73] Assignee: Flexi-Coil Ltd., Saskatoon, Canada

[21] Appl. No.: 08/972,172

[22] Filed: Nov. 18, 1997

[51] Int. Cl.⁶ .................................................. B65G 33/00
[52] U.S. Cl. .......................................... 198/671; 414/326
[58] Field of Search .................................. 198/671, 670, 198/658; 414/326; 222/413

[56] References Cited

U.S. PATENT DOCUMENTS

| | | | |
|---|---|---|---|
| 931,054 | 8/1909 | Gardner | 198/671 |
| 1,787,671 | 1/1931 | Daniels, Sr. | 198/671 |
| 1,909,236 | 5/1933 | Hoke | 198/671 |
| 3,409,119 | 11/1968 | Mayrath | 198/671 |
| 3,971,195 | 7/1976 | Rowland-Hill | 56/14.6 |
| 4,220,434 | 9/1980 | Letzig | 414/326 |
| 4,535,915 | 8/1985 | West | 198/671 |
| 4,850,307 | 7/1989 | Sheets | 119/51 |
| 5,205,416 | 4/1993 | Van Zee | 209/283 |
| 5,335,619 | 8/1994 | Pollock | 119/57 |
| 5,513,597 | 5/1996 | Pollock | 119/57 |

FOREIGN PATENT DOCUMENTS

| | | | |
|---|---|---|---|
| 132064 | 8/1978 | Germany | 198/671 |
| 11259 | 1/1988 | Japan | 198/670 |

*Primary Examiner*—William E. Terrell
*Assistant Examiner*—Khoi H. Tran
*Attorney, Agent, or Firm*—Griffin, Butler, Whisenhunt & Szipl, LLP

[57] ABSTRACT

A low-splash auger system is provided wherein an auger is housed within a housing. A portion of the auger extends out of an end of the housing for insertion into a hopper. The end of the housing is slanted for minimizing product from splashing upward when the auger is in use.

3 Claims, 3 Drawing Sheets

LOW SPLASH AUGER INLET

FIELD OF THE INVENTION

This invention relates to augers or screw conveyers for moving material from one location to another, and more particularly in one instance for moving particulate matter such as seed, fertilizer or grain from a hopper to another location. Screw conveyors, augers and the like incorporate or comprise a screw member for propelling particulate, granular or other free-flowing material along the length of the screw member in an axial direction as determined by the sense of rotation of the screw member. The propulsion of that material is achieved by the successive turns of a continuous helical blade known in the art as flighting which in most cases encircles, is secured on, and radiates from a central driving shaft which is arranged for rotation by an appropriate power source.

Most modern farms typically use power-operated augers of various sizes to move grain, seed and or other particulate from unloading areas to storage bins, transport trucks and planters. One particular example is the use of an auger to load seed and/or fertilizer from a grain truck into the tanks of an air cart. Portable augers used for this purpose generally have an integral hopper having low sides to allow the auger inlet hopper to be placed in a plurality of locations where space may be limited; for example the inlet hopper can be disposed below an outlet of an air cart tank with the auger outlet placed above a grain truck. One problem associated with the use of this type of auger having a hopper with low sides, is that the exposed auger within an open hopper will have a tendency to throw grain out of the hopper, particularly when the level of the particulate within the hopper is reduced so that only a portion of the auger is covered.

Another advantage of this invention is that there is less clean-out residue as the auger picks up material more efficiently, thus the residue level is low relative to the size of the hopper. The size of the hopper is not critical. The auger of this invention allows the auger flights to pick up most of the particulate matter in the hopper after filling of the hopper has stopped. An inefficient auger leaves a greater quantity of particulate matter in the bottom of the hopper leading to wastage or the need to find an alternate method of transporting the leftover grain.

It is an object of this invention to lessen this problem.

It is a further object of the invention to provide an auger having an inlet port that substantially obviates the problem of grain being thrown upward instead of efficiently being fed into the auger port.

SUMMARY OF THE INVENTION

In accordance with the invention, there is provided, an auger system for moving material from one location to another, comprising:
  a rotatable screw conveyer;
  a housing having an open end for accommodating a portion of the rotatable screw conveyer, said conveyer extending beyond the open end of the housing, said open end being inclined at an angle with respect to the longitudinal axis of the rotatable screw conveyer so as to minimize an upward throwing of the material.

In accordance with another aspect of the invention, there is provided, an auger system comprising:
  auger means having an auger shaft housed within a conduit, a portion of the auger shaft extending out a receiving end of the conduit;
  a hopper for containing material, the hopper having a port at an end thereof for receiving the auger means, the auger means when inserted into the port forming an inlet region for the material to be fed into the auger means, the feed length of the inlet region being greater adjacent the auger means about a lower portion of the hopper than about a higher portion of the hopper adjacent the auger means.

In accordance with the invention, there is provided, an auger for carrying material from a first location to a second location, comprising:
  a housing for accommodating a portion of the auger, the housing having an inlet end at the first location and an outlet end at the second location, the housing including a substantially longitudinal sleeve, the inlet end of the sleeve being slanted with respect to the longitudinal axis of the sleeve for increasing a confinement of the material about the inlet end and for lessening an upward scattering of the material,
  an auger being sized to fit within the sleeve and protruding out of the slanted inlet end of the sleeve.

In yet another aspect of the invention, a method is provided for confining material about an auger within an inlet hopper comprising the steps of:
  providing a smaller opening for receiving the material at an upper portion of the inlet hopper, than at a lower portion of the inlet hopper.

Advantageously, the invention provides a smaller inlet about the top of the exposed auger extending beyond its housing than about the bottom of the auger extending beyond the housing; this angling of the housing reduces the amount of spillage out of the hopper when the auger is conveying material; further, this provides a greater effective feed length and at the same time, reduces the size of hopper safety screen required.

BRIEF DESCRIPTION OF THE DRAWINGS

Exemplary embodiments of the invention will now be described in conjunction with the drawings, in which.

DETAILED DESCRIPTION

Figure 1:
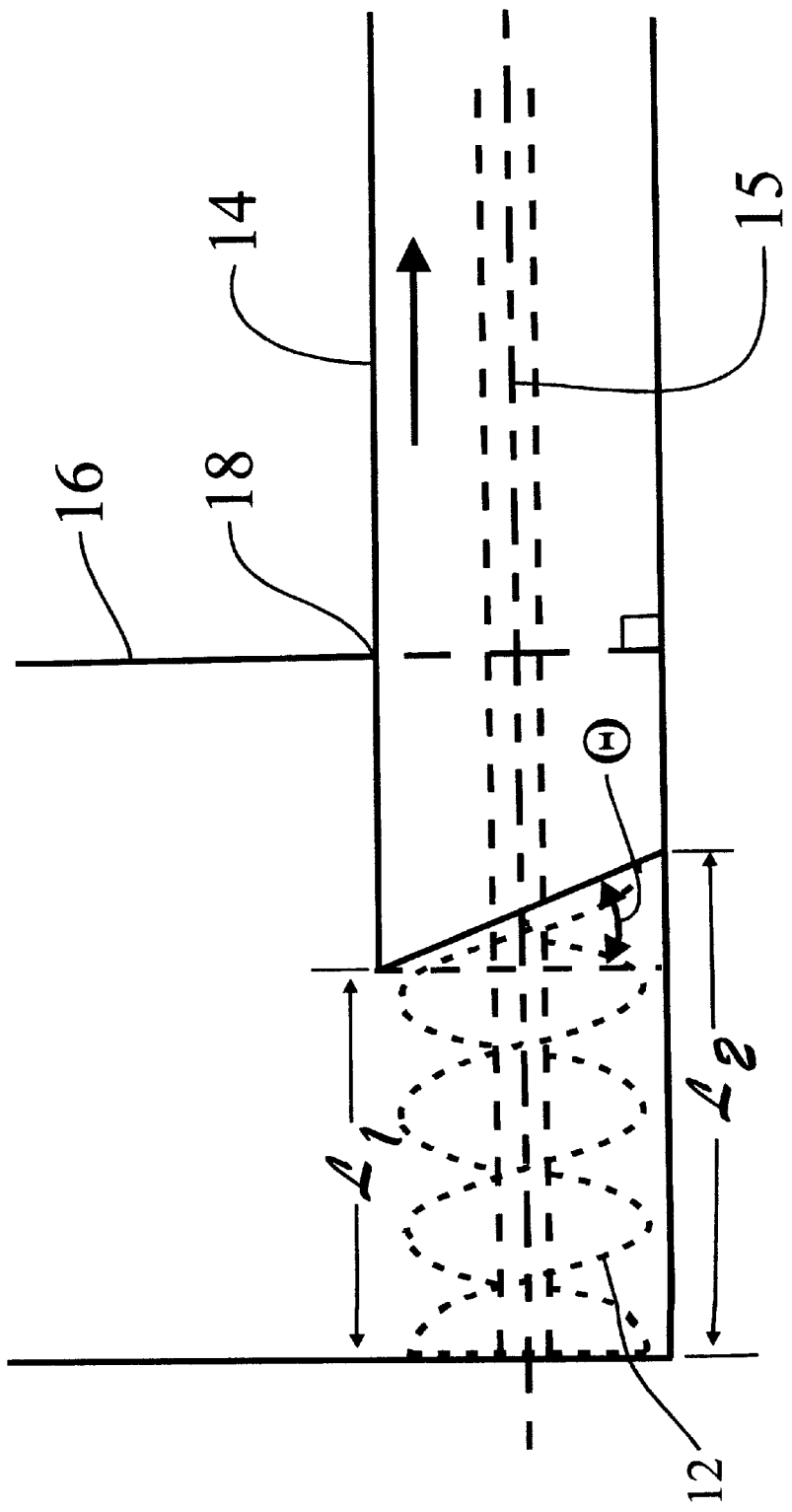
FIG. 1 is a side view of an auger inserted into the bottom of a hopper, in accordance with the invention; and, FIG. 1a is a side view of an auger inserted into the bottom of a hopper, in accordance with alternative embodiment of the invention; and, FIG. 2 is a detailed side view shown partly in cross-section of the auger shown in FIG. 1 having an integral hopper.

Turning now to FIG. 1, an auger having a rotatable conveyer screw 12 having flights housed within and extending beyond an open ended housing 14 is shown inserted into an opening 18 at lower end of a hopper 16. In this exemplary embodiment, the longitudinal axis of the auger screw 12 lies substantially horizontally and is rotatable along the same longitudinal axis 15 coincident with the housing centre line, however, in other preferred embodiments the auger screw 12 and integral hopper are inclined. As the screw turns, material within the hopper adjacent the screw 12 is transported in the direction of product flow, indicated by an arrow shown pointing to the right. The open end of the housing 14 is slanted, indicated by an angle θ. This slanted end ensures that the effective feed length $l_2$ at the bottom of the conveyer screw 12, is greater than the effective feed length $l_1$ at the top of the conveyer screw 12.

Figure 1A:
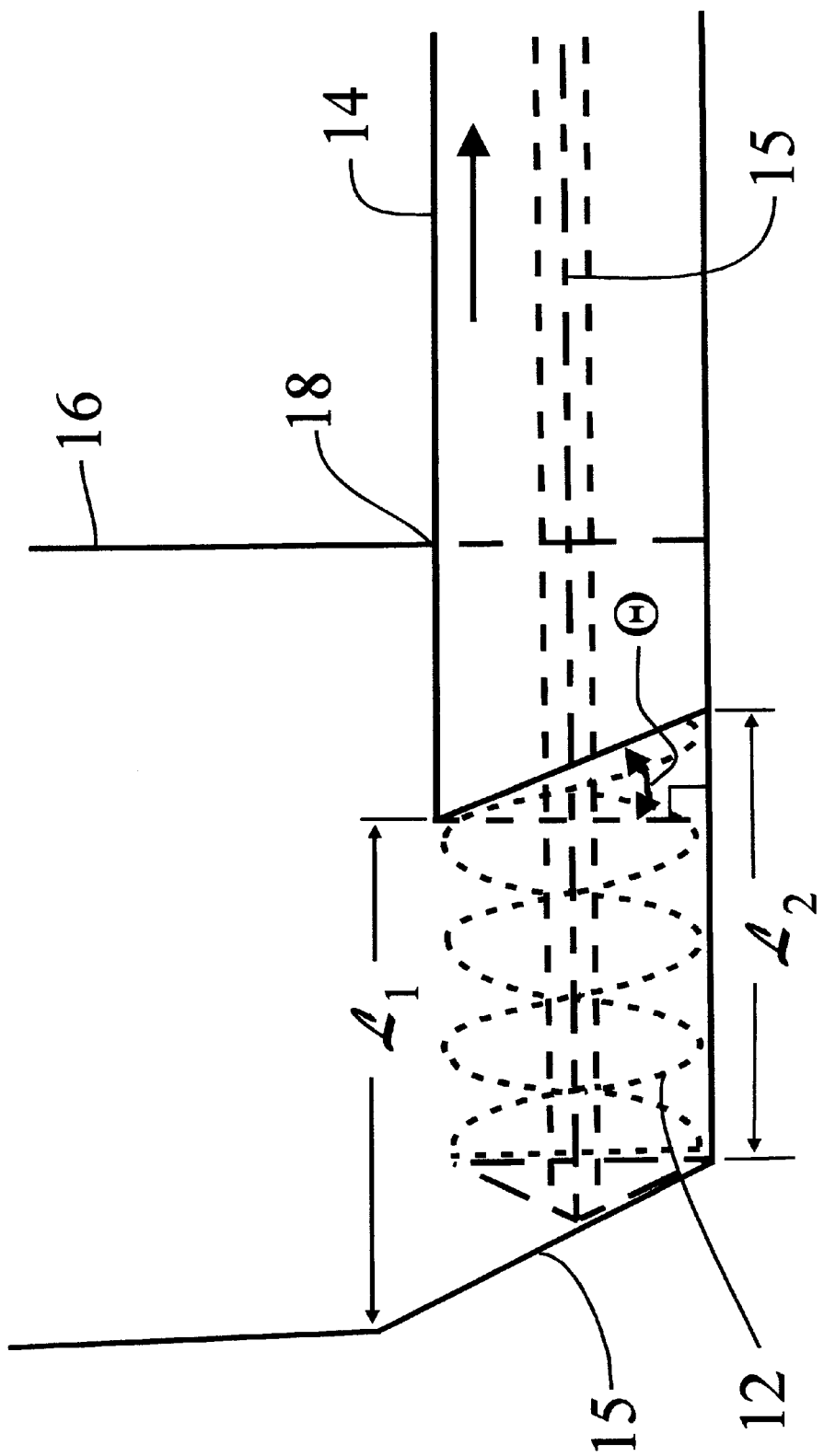

Generally, in conventional hoppers the effective feed length $l_2$ at the bottom of the conveyer screw 12, is equal to the effective feed length $l_1$ at the top of the conveyer screw 12 and the material within the hopper tends to follow the flighting in a direction perpendicular to the shaft, out of the hopper, producing a "boiling" effect. This effect is considerably lessened and in some instances is nearly obviated in the portable low-sided hopper in accordance with this invention where $l_1 < l_2$. Advantageously, less material is wasted by being thrown out of the sides of the hopper 16, and furthermore, material is more efficiently provided to the auger for transport. In a preferred embodiment, the angle θ shown in FIG. 1 is between 25 and 60. In yet an alternative embodiment of the invention, shown in FIG. 1a, a back wall 15 of the hopper may be slanted at a substantially same angle θ, to allow $l_1 = l_2$, however providing the advantage of the slanted housing 14. Yet still further, the back of the hopper wall can be sloped such that $l_1 > l_2$.

Figure 2:
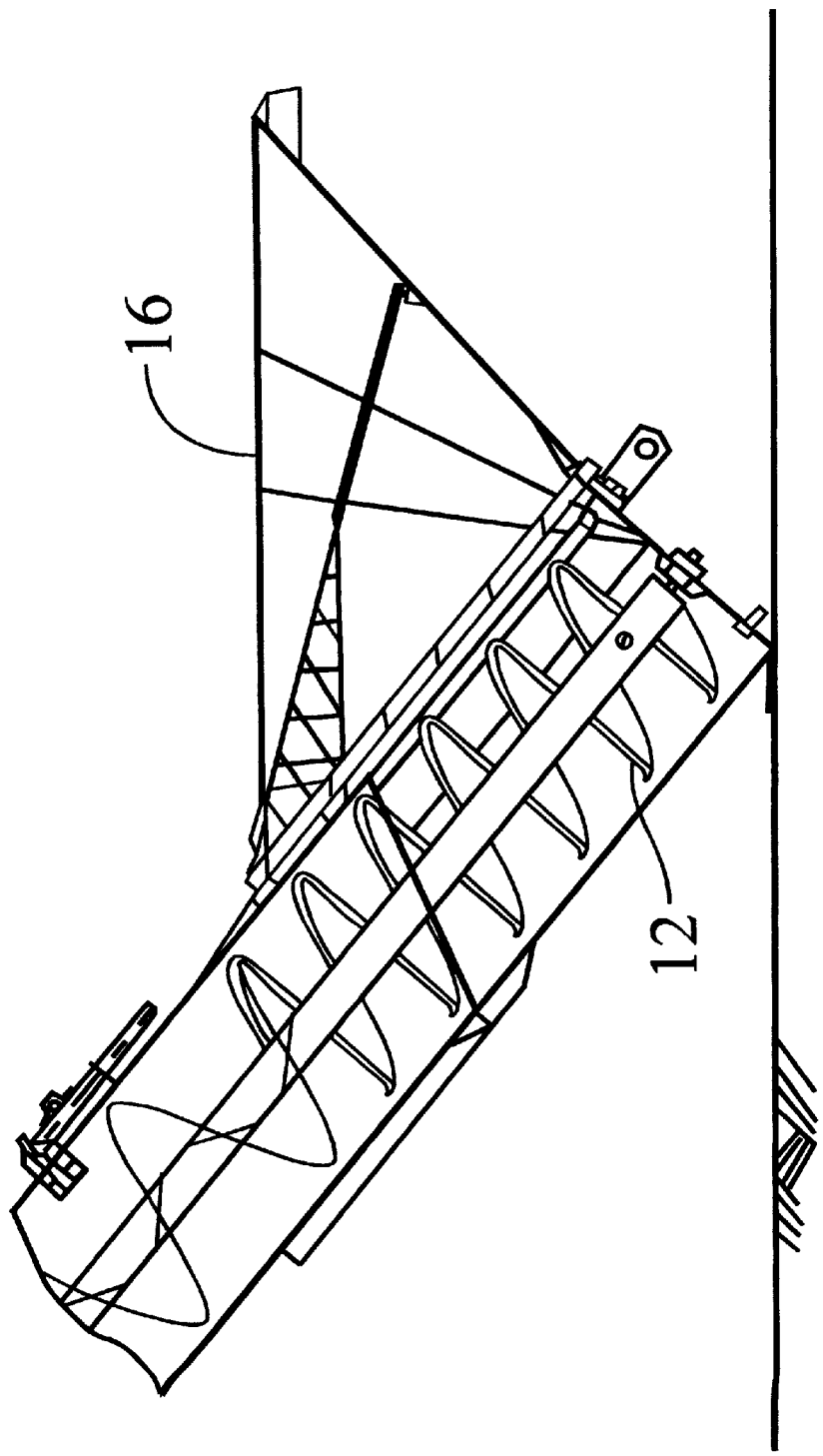

FIG. 2 shows a more detailed illustration of the auger in accordance with the invention.

Of course, numerous other embodiments may be envisaged without departing from the spirit and scope of the invention.

What is claimed is:

1. In an auger mechanism for conveying material from one location to another, said auger having a screw-like conveyor that is rotatable about a central shaft member defining an axis of rotation, said screw-like conveyor having a concentric housing surrounding said screw-like conveyor, and a hopper having an open top said screw-like conveyor extending beyond said housing to be positioned at the bottom of said hopper to engage a supply of said material for feeding into said screw-like conveyor so as to be conveyed along said housing, the improvement comprising:

said housing having an infeed end and a terminal edge lying in a plane that is angled with respect to a plane that is perpendicular to said axis of rotation at said infeed end said housing being connected to said hopper at said infeed end said terminal edge being oriented such that said screw-like conveyor is exposed from said housing more at a bottom portion of said screw-like conveyor than at a top portion of said screw-like conveyor, so that said screw-like conveyor has a greater feed length within said hopper along said bottom portion of said screw-like conveyor than along said top portion of said screw-like conveyor.

2. The auger mechanism of claim 1 wherein said plane corresponding to said terminal edge of said housing is slanted relative to said plane perpendicular to said axis of rotation at an angle in the range of between 25 degrees and 60 degrees.

3. In an agricultural implement having a frame; an auger mechanism for conveying material; a hopper having an open top with said auger member rotating about a central shaft member defining an axis of rotation positioned at a closed bottom of said hopper, said auger mechanism further having a housing concentric with said auger member and being cooperable with said auger member to convey material along said concentric housing from said hopper to said tank, the improvement comprising:

said housing having an infeed end and a terminal edge lying in a plane that has an angle of repose in the range between 25 degrees and 60 degrees with respect to a plane that is perpendicular to said axis of rotation at said infeed end said housing being connected to said hopper at said infeed end said housing being oriented such that said auger member has a greater feed length within said hopper along said closed bottom than along said open top.

* * * * *